April 25, 1933.  H. LEDWINKA  1,905,594
POWER DRIVEN VEHICLE
Filed Jan. 16, 1930    3 Sheets-Sheet 1

H. Ledwinka
INVENTOR

By: Marks & Clerk
Attys.

April 25, 1933.   H. LEDWINKA   1,905,594
POWER DRIVEN VEHICLE
Filed Jan. 16, 1930   3 Sheets-Sheet 2

H. Ledwinka
INVENTOR
By: Marks & Clerk
Attys.

April 25, 1933.  H. LEDWINKA  1,905,594
POWER DRIVEN VEHICLE
Filed Jan. 16, 1930  3 Sheets-Sheet 3

H. Ledwinka
INVENTOR

By: Marks &Clerk
Attys.

Patented Apr. 25, 1933

1,905,594

UNITED STATES PATENT OFFICE

HANS LEDWINKA, OF KOPRIVNICE, CZECHOSLOVAKIA

POWER-DRIVEN VEHICLE

Application filed January 16, 1930, Serial No. 421,281, and in Germany January 23, 1929.

This invention relates to a power-driven vehicle with electric power transmission between the internal combustion engine or the like and the driving wheels. The invention relates more particularly to power-driven vehicles of the kind in which the chassis frame consists of a central tubular member to which the half axles supporting the driving wheels are attached and in which the casings of the generator and the electric motor form an extension of the tubular supporting part.

The great advantage of electric power transmission for vehicles having an internal combustion engine or the like consists in the possibility of continuously changing the gear when starting.

The invention consists in the provision of a mechanical transmission gear which can be interposed in place of the electric power transmission between the internal combustion engine or the like and the driving wheels. Preferably according to the invention means are provided for automatically disengaging the electric power transmission simultaneously with the engagement of the mechanical power transmission.

The main advantage of the new arrangement consists in this, that after a certain speed is reached, more particularly in travelling long distances, the direct mechanical power transmission can be made operative in place of the electric power transmission and that the losses inherent in the electric generator and the electric motor determined by their efficiency are eliminated.

The engagement of the mechanical power transmission in place of the electric power transmission can be effected either by the driver or can be effected automatically after a certain speed is reached. In the case of an automatic changing-over, the arrangement is preferably made such that the change-over can also be effected by the driver in order that, should the electric power transmission fail, the vehicle will not break down completely but can continue to be driven even if only with the so-called direct operation.

According to the invention in vehicles in which a longitudinal shaft is driven by the electric motor serving for the electric power transmission, which shaft drives the axles coupled to the wheels, the same longitudinal shaft can be coupled mechanically with the engine. In general it is not necessary simultaneously to uncouple the electric motor from the longitudinal shaft. Even when the mechanical power transmission is being used, the electric motor can continue to run, as when the electric power transmission is put out of operation, the only losses will be due to the slight friction in its bearings.

According to the invention the generator shaft which is coupled to the internal combustion engine can be coupled to a shaft which serves the purpose of mechanically transmitting the power to the driving wheels in which case the generator will run idle and only the small friction losses in the generator bearings will have to be overcome when the electric power transmission is out of operation.

Thus in many cases, more particularly in the case of power driven vehicles having a central tubular supporting member which is formed partly by the generator casing and the casing of the electric motor, it is only necessary to interpose between the longitudinal shaft which is connected to the electric motor and drives the transverse shafts and the generator shaft a clutch which is capable of being engaged and disengaged and to provide a correspondingly long intermediate shaft.

The invention is more particularly described below with reference to the constructional examples shown in the accompanying drawings.

Figure 1A:
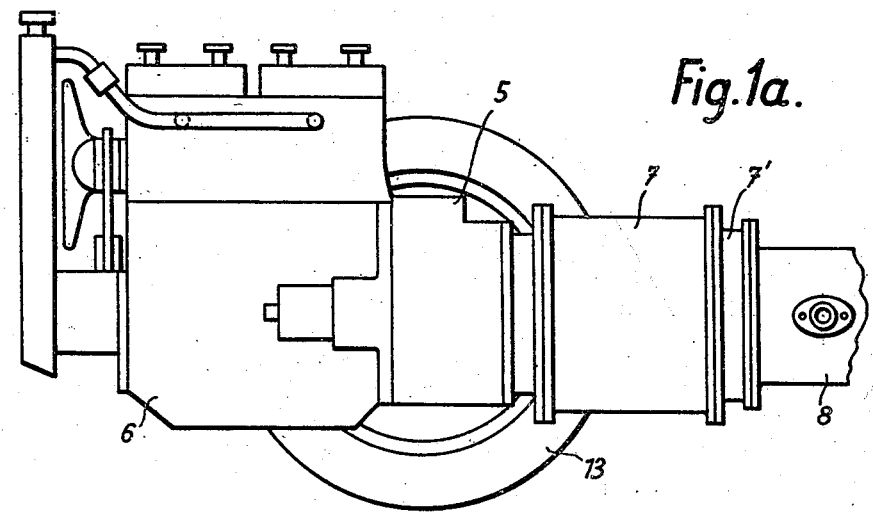
Figs. 1a and 1b show a six-wheel vehicle in side elevation.

The chassis frame consists of several tubular parts which are rigidly connected together, namely the gear casing 5 to which the internal combustion engine 6 is fixed by flanges so as to overhang, the generator casing 7 with its two covers 7', a relatively long tubular connecting part 8, the forward differential gear casing 9, a shorter tubular part 10, the rear differential casing 11, and the electric motor casing 12 which is fixed by its front cover 12' to the rear differential casing 11. The steering wheels 13, 13' are supported by the half axles 14, 14' pivotally attached to the chassis casing and struts 14a, 14a'. The generator 7 is coupled directly or through gearing provided in the casing 5 with the internal combustion engine 6.

To the forward differential casing 9 the half axles 16, 16' supporting the forward driving wheels 15, 15' are connected so as to be capable of swinging upwards and downwards and contain the transverse shafts 17 and 17' which are coupled to the driving wheels. To the rear differential casing 11 the half axles 19, 19' supporting the rear driving wheels 18, 18' are pivoted in a similar manner so as to be capable of swinging upwards and downwards and contain the transverse shafts 20, 20' which are coupled to the driving wheels.

For transmitting the motion of the electric motor to the driving wheels a longitudinal shaft 21 is journalled in the tubular supporting member, the said longitudinal shaft preferably forming a direct continuation of the shaft of the electric motor. The longitudinal shaft 21 is connected to the driving parts of two spur wheel differentials 22 and 23.

The differential 22 drives two bevel wheels 24, 24' which mesh with bevel wheels 25 and 25' connected to the two transverse shafts 17 and 17'. The bevel wheel 24 is fixed on a hollow shaft 26 which can turn freely on the shaft 21. The bevel wheel 24' is mounted so as to turn freely on the hollow shaft 26.

The transverse shafts 20, 20' which are coupled with the rear driving wheels are driven through the second differential 23 in the same manner as just described with reference to the transverse shafts 17, 17' which are coupled to the front driving wheels. For the rear driving wheels two bevel wheels 27, 27' are provided which are coaxial with the driving shaft 21 and are driven through the differential 23 and which mesh with the bevel wheels 28, 28' fixed to the shafts 20, 20' of the half axles. The bevel wheel 27' is fixed to a hollow shaft 29' which turns on the shaft 21 and on which the bevel wheel 27 can turn freely.

The shaft 21 is extended forwardly beyond the differential 22 and its free end can be coupled through a suitable clutch 30 to the rearward extension of the generator shaft 31. Lever transmission gear 32 which is modified to suit each particular case and is only shown diagrammatically in the drawings is provided for operating the clutch 30.

When starting the vehicle the generator 7 is driven by the internal combustion engine 6 and the current generated by the generator 7 feeds the electric motor 12 which drives the driving wheels 15, 15', 18, 18' through the described mechanical transmission members. After a certain speed is reached the longitudinal shaft 21 which drives the driving wheels can, in order to avoid the losses of electric power transmission, be mechanically connected by means of the clutch 30 with the internal combustion engine 6, the electric power transmission being at the same time put out of operation. The generator 7 and the motor 12 can continue to run idly when the mechanical power transmission gear between the driving wheels and the internal combustion engine are in operation, as there will only be the small losses due to friction in the bearings when the electric power transmission is inoperative.

Figure 3:
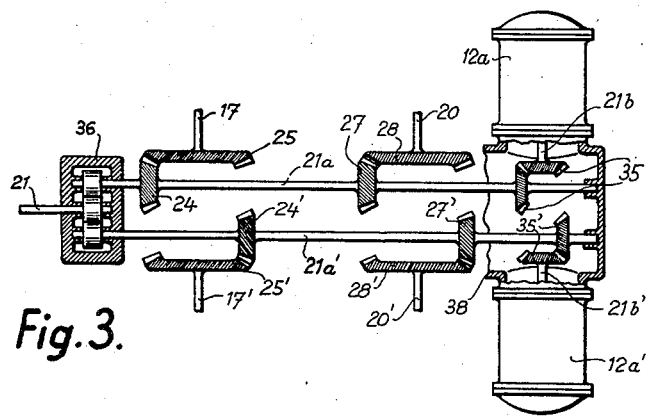
Figs. 3, 4 and 5 show diagrammatically in plan view three further constructional examples of the invention.

In the exmaple shown in Fig. 3 the transverse shafts 17, 20 at one side of the vehicle are driven by a longitudinal shaft 21a and the transverse shafts 17', 20' at the other side of the vehicle by a second longitudinal shaft 21a' through suitable bevel wheels 24, 25, 27, 28 and 24', 25', 27', 28' respectively. The two longitudinal shafts 21a and 21a' are themselves driven each by an electric motor 12a, 12a'. The shafts 21b, 21b' of the electric motors and the longitudinal shafts 21a, 21a' may be arranged as shown at right angles to one another and be connected to one another through pairs of bevel wheels 35, 35'.

For the mechanical transmission of the motion of the internal combustion engine to the driving wheels the forward ends of the shafts 21a, 21a' are connected with one another through a differential 36 which is driven by a shaft 21 which can be coupled directly to the internal combustion engine.

Figure 2A:
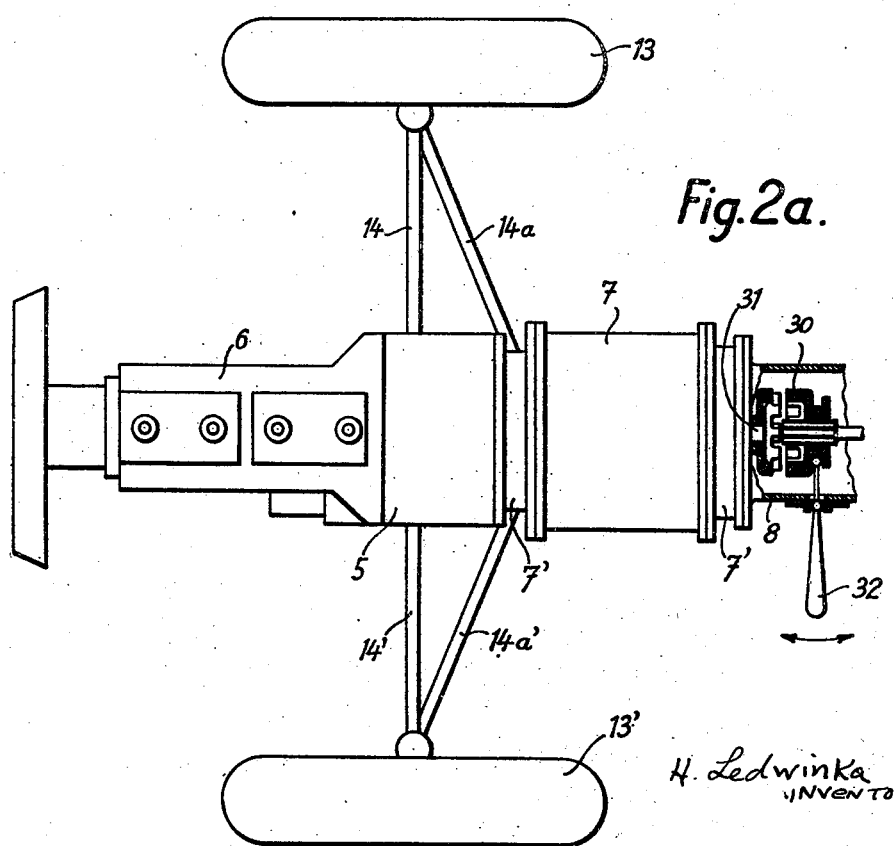
Figs. 2a and 2b show the corresponding plan view partly in section with the driving members shown diagrammatically.
Figure 1B:
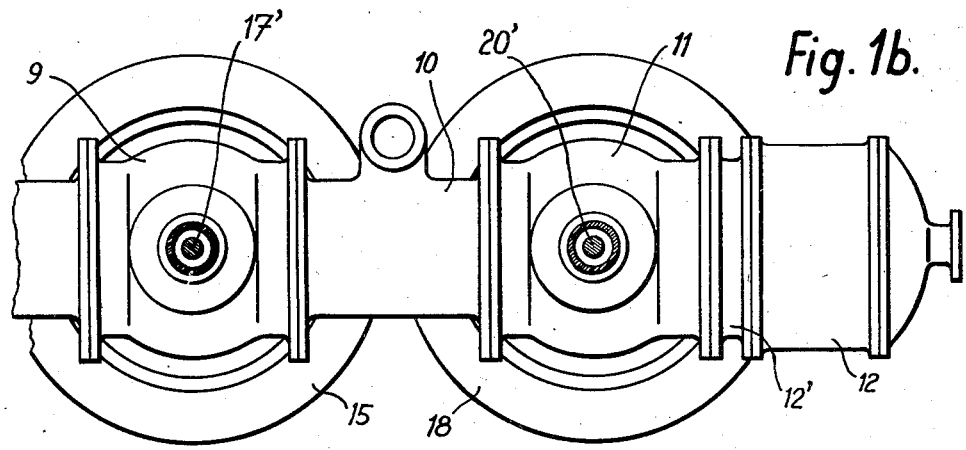
Figure 2B:
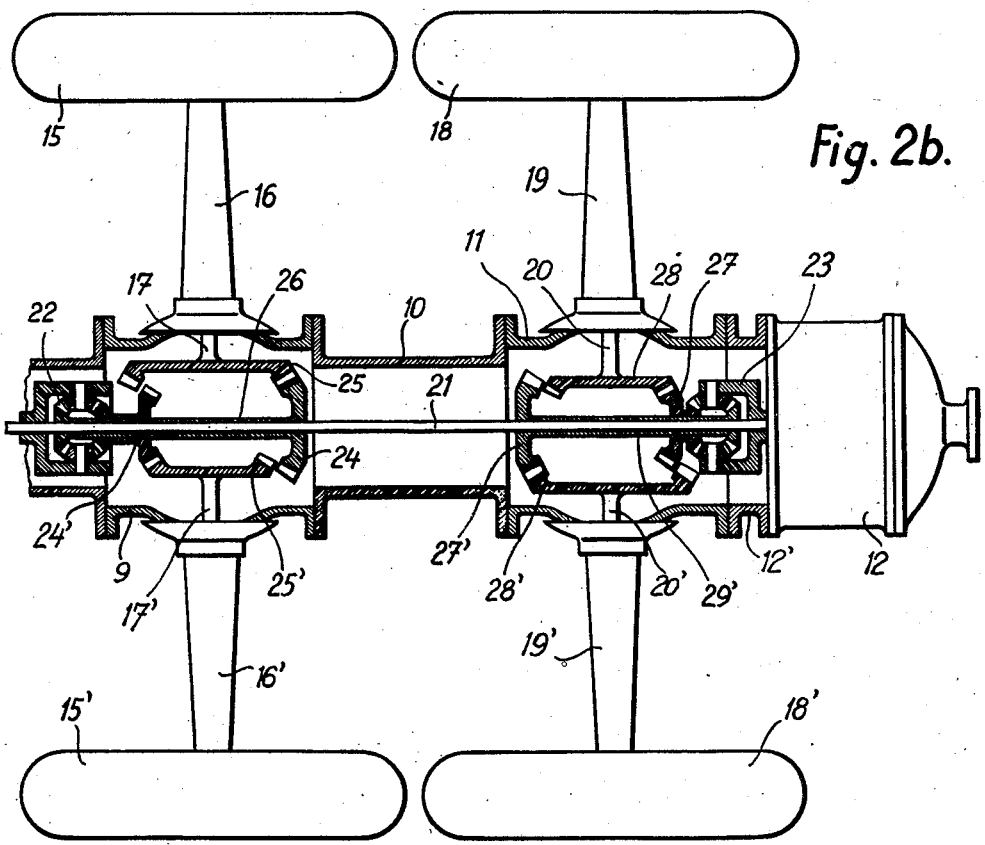

In the constructional forms just described the motors can be arranged as in the examples shown in Figs. 1 and 2 at the rear end of the vehicle or of the tubular chassis frame and are therefore easily accessible and removable. The motors are preferably fixed to a casing 38 mounted on the rear differential casing.

Figure 4:
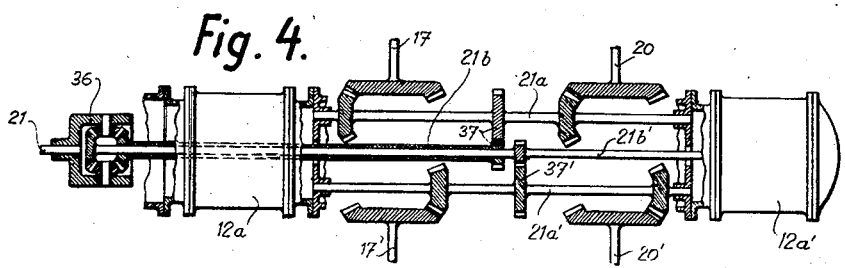

In the example shown in Fig. 4, similarly to the example shown in Fig. 3, two longitudinal shafts 21a and 21a' are provided, each of which drives the driving wheels lying on one side of the vehicle through bevel wheels and half axle shafts. The shaft 21a is driven by an electric motor 12a disposed in front of the forward pair of transverse shafts 17, 17', the hollow shaft 21b of the motor driving the shafts 21a by means of a pair of spur wheels 37. The shafts 21a' is driven in a similar manner by the electric motor 12a' which is mounted at the rear end of the vehicle and the shaft 21b' of which drives the shaft 21a' through a pair of spur wheels 37'. The shaft 21b' of the rear electric motor extends through the hollow shaft 21b of the forward electric motor, the two shafts 21b, 21b' being connected through a differential 36 to the shaft 21 which can be coupled mechanically with the internal combustion engine.

Figure 5:
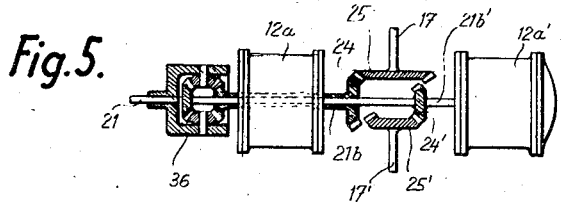

Fig. 5 shows the arrangement in which a separate motor is used for driving each of the two driving wheel shafts 17, 17' of a vehicle. Similarly as in the previous example the shaft 21b of the forward motor 12a, which is in engagement through a pair of bevel wheels 24, 25 with the shaft 17, is hollow and contains the shaft 21b' of the rear motor 12a', which is in engagement through a pair of bevel wheels 24', 25' with the other driving wheel shaft 17'. As in the previous example the two shafts 21b, 21b' are connected through a differential 36 to the shaft 21 which can be coupled mechanically with the internal combustion engine.

In the examples shown in Figs. 4 and 5 the electric motors also preferably form a part or a continuation of a central tubular longitudinal member acting as the chassis frame or, as shown in Fig. 3, they are mounted laterally on a portion or a continuation of the said longitudinal member. In these constructional examples the differential casings and the other parts of the tubular chassis frame are not shown, so as to simplify the drawings. The electric motor or electric motors can also be mounted on the tubular supporting member in other positions in the vehicle, for instance in the case of six-wheel wagons between the two pairs of axles. This possible arrangement was definitely referred to in the previous application No. 405,519 of July 11, 1929.

What I claim is:

1. A motor driven vehicle comprising driving wheels, an engine, electrical and mechanical power transmission devices between the engine and the driving wheels, the electrical transmission device including a generator driven by the engine and an electric motor operated by the generator, said electrical and mechanical power transmission devices including a shaft driven by the electric motor, a hollow shaft mounted on the first mentioned shaft, a gear wheel carried by the hollow shaft, means connecting the gear wheel with one of the driving wheels, a second gear wheel freely rotatable on the hollow shaft and means connecting the second gear wheel with the other drive wheel and a differential gear between the electric motor driven shaft and said gear wheels, and a tubular carrier arranged in the central longitudinal plane of the vehicle and constituting the chassis frame, said tubular carrier embracing the electric motor, generator and said shaft.

2. A motor driven vehicle comprising driving wheels, an engine, a tubular carrier arranged in the central longitudinal plane of the vehicle and constituting the chassis frame, electrical and mechanical power transmission devices between the engine and the driving wheels, said tubular carrier enclosing the electrical and mechanical power transmission devices, characterized in that said electrical and mechanical power transmission devices include separate electric motors for driving the drive wheels at the respective sides of the vehicle, shafts operated by the respective motors, and a differential driven by the engine and interposed between the two motor operated shafts.

3. A vehicle as claimed in claim 2 having gear wheels establishing a driving connection between the electric motors and said shafts.

4. A vehicle as claimed in claim 2, said electric motors being secured side by side at the rear of the tubular carrier.

5. A vehicle as claimed in claim 2, said electric motors being arranged with their axes disposed perpendicularly to the axes of said shafts and being connected with the latter by gear wheels.

6. A vehicle as claimed in claim 2, said electric motors being arranged in axial alinement and including motor shafts, one of the motor shafts being hollow and receiving the shaft of the other motor, and gear connections between the motor shafts and the first mentioned shafts.

In testimony whereof I have signed my name to this specification.

HANS LEDWINKA.